(12) United States Patent
Chen et al.

(10) Patent No.: US 10,410,697 B2
(45) Date of Patent: Sep. 10, 2019

(54) SENSING CIRCUIT WITH VOLTAGE CLAMP FOR NON-VOLATILE MEMORY

(71) Applicant: eMemory Technology Inc., Hsin-Chu (TW)

(72) Inventors: Chih-Chun Chen, Taipei (TW); Chun-Hung Lin, Hsinchu (TW); Cheng-Da Huang, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 15/942,837

(22) Filed: Apr. 2, 2018

(65) Prior Publication Data
US 2018/0315482 A1 Nov. 1, 2018

Related U.S. Application Data

(60) Provisional application No. 62/490,612, filed on Apr. 27, 2017.

(51) Int. Cl.
*G11C 16/26* (2006.01)
*G11C 16/04* (2006.01)
(Continued)

(52) U.S. Cl.
CPC .............. *G11C 7/22* (2013.01); *G06F 7/00* (2013.01); *G06F 21/73* (2013.01); *G11C 7/062* (2013.01);
(Continued)

(58) Field of Classification Search
CPC ......... G11C 16/06; G11C 16/26; G11C 16/32; G11C 11/5642; G11C 16/045;
(Continued)

(56) References Cited

U.S. PATENT DOCUMENTS 6,798,267 B1  9/2004  Roberts et al.
7,995,397 B1  8/2011  Raghavan
(Continued)

FOREIGN PATENT DOCUMENTS

EP  2456152 A2  5/2012

OTHER PUBLICATIONS

Sedra et al., Microelectronic Circuits, Oxford University Press, International sixth Edition (2011) pp. 178 and 514.
(Continued)

*Primary Examiner* — Gene N Auduong
(74) *Attorney, Agent, or Firm* — WPAT, PC

(57) ABSTRACT

A sensing circuit includes a sensing stage. The sensing stage includes a voltage clamp, a P-type transistor and an N-type transistor. The voltage clamp receives a first power supply voltage and generates a second power supply voltage. The source terminal of the P-type transistor receives the second power supply voltage. The gate terminal of the P-type transistor receives a cell current from a selected circuit of a non-volatile memory. The drain terminal of the N-type transistor is connected with the drain terminal of the P-type transistor. The gate terminal of the N-type transistor receives a bias voltage. The source terminal of the N-type transistor receives a ground voltage. In a sensing period, the second power supply voltage from the voltage clamp is fixed and lower than the first power supply voltage.

8 Claims, 5 Drawing Sheets

(51) Int. Cl.
| | |
|---|---|
| G11C 16/32 | (2006.01) |
| G11C 11/56 | (2006.01) |
| G11C 7/22 | (2006.01) |
| H01L 27/06 | (2006.01) |
| H01L 27/112 | (2006.01) |
| G06F 21/73 | (2013.01) |
| G11C 7/06 | (2006.01) |
| G11C 7/12 | (2006.01) |
| G11C 7/24 | (2006.01) |
| G11C 17/16 | (2006.01) |
| G11C 17/18 | (2006.01) |
| G11C 16/34 | (2006.01) |
| G11C 29/44 | (2006.01) |
| G11C 16/08 | (2006.01) |
| G11C 16/24 | (2006.01) |
| H02H 9/04 | (2006.01) |
| G06F 7/00 | (2006.01) |
| H04L 9/08 | (2006.01) |
| G11C 16/06 | (2006.01) |
| G11C 16/10 | (2006.01) |
| G11C 16/14 | (2006.01) |

(52) U.S. Cl.
CPC ............... *G11C 7/12* (2013.01); *G11C 7/24* (2013.01); *G11C 11/5642* (2013.01); *G11C 16/045* (2013.01); *G11C 16/08* (2013.01); *G11C 16/24* (2013.01); *G11C 16/26* (2013.01); *G11C 16/32* (2013.01); *G11C 16/34* (2013.01); *G11C 17/16* (2013.01); *G11C 17/18* (2013.01); *G11C 29/44* (2013.01); *H01L 27/0629* (2013.01); *H01L 27/11206* (2013.01); *H02H 9/04* (2013.01); *H04L 9/0866* (2013.01); *G11C 7/06* (2013.01); *G11C 16/06* (2013.01); *G11C 16/10* (2013.01); *G11C 16/14* (2013.01)

(58) Field of Classification Search
CPC ......... G11C 16/08; G11C 16/10; G11C 16/14; G11C 16/24; G11C 16/34; G11C 17/16; G11C 17/18; G11C 29/44; G11C 7/06; G11C 7/062; G11C 7/12; G11C 7/22; G11C 7/24

See application file for complete search history.

(56) References Cited

U.S. PATENT DOCUMENTS

| | | | |
|---|---|---|---|
| 8,189,402 B2 * | 5/2012 | Lin | G11C 7/062 365/189.07 |
| 9,214,203 B2 * | 12/2015 | Wang | G11C 7/12 |
| 2011/0310678 A1 * | 12/2011 | Lin | G11C 7/062 365/189.07 |
| 2015/0228315 A1 | 8/2015 | Wang et al. | |

OTHER PUBLICATIONS

Taiwan Intellectual Property Office, Office action dated Nov. 29, 2018.

* cited by examiner

SENSING CIRCUIT WITH VOLTAGE CLAMP FOR NON-VOLATILE MEMORY

This application claims the benefit of U.S. provisional application Ser. No. 62/490,612, filed Apr. 27, 2017, the subject matter of which is incorporated herein by reference.

FIELD OF THE INVENTION

The present invention relates to a sensing circuit, and more particularly to a sensing circuit for a non-volatile memory.

BACKGROUND OF THE INVENTION

As is well known, a non-volatile memory is able to continuously retain data after the supplied power is interrupted. Generally, after the non-volatile memory leaves the factory, the user may program the non-volatile memory in order to record data into the memory cells of the non-volatile memory.

According to the number of times the non-volatile memory is programmed, the non-volatile memory cells may be classified into several types, including multi-time programmable memory cells (also referred as MTP memory cells), one time programmable memory cells (also referred as OTP memory cells) and mask read-only memory cells (also referred as Mask ROM memory cells).

Generally, the stored data of the MTP memory cell may be modified many times. On the contrary, the OTP memory cell may be programmed once. After the OTP memory cell is programmed, the stored data cannot be modified. After the mask read-only memory cells leaves the factory, all stored data have been recorded therein. The user is only able to read the stored data from the mask read-only memory cells, but is unable to program the mask read-only memory cells.

Moreover, the memory cell of the non-volatile memory can be programmed to at least two storage states. For example, the memory cell in the first storage state generates a lower cell current, and the memory cell in the second storage state generates a higher cell current. While a read action is performed, a sensing circuit judges the storage state of the memory cell according to the magnitude of the cell current. Generally, the first storage state is referred as an erased state, and the second storage state is referred as a programmed state.

FIG. 1A is a schematic circuit diagram illustrating a sensing circuit for a conventional non-volatile memory. FIG. 1B is a schematic timing diagram illustrating associated signals processed by the sensing circuit of FIG. 1A.

As shown in FIG. 1A, the non-volatile memory 110 comprises plural memory cells cell_1~cell_n and a select circuit 112. The plural memory cells cell_1~cell_n are connected with plural input terminals of the select circuit 112. The output terminal of the select circuit 112 is connected with the sensing circuit 120.

Generally, after a control circuit (not shown) determines a selected cell from the non-volatile memory 110, the selected cell is connected with the sensing circuit 120 through the select circuit 112. Consequently, the sensing circuit 120 judges the storage state of the selected cell.

For example, if the memory cell cell_2 is determined as the selected cell while the read action is performed, the memory cell cell_2 generates a cell current Icell. The cell current Icell is transmitted to the sensing circuit 120 through the select circuit 112.

Generally, a parasitic capacitor Cpara such as a bit-line parasitic capacitor is formed between the non-volatile memory 110 and the sensing circuit 120. When the memory cell cell_2 generates the cell current Icell, the cell current Icell will charge the parasitic capacitor Cpara.

Please refer to FIG. 1 B. When the cell current Icell generated by the memory cell cell_2 is outputted from the select circuit 112, a sensing voltage Vsense at the input terminal of the sensing circuit 120 is gradually increased. Consequently, the sensing circuit 120 determines the storage state of the memory cell cell_2 according to the sensing voltage Vsense.

For example, the triggering voltage of the sensing circuit 120 is Vtrig-A. If the memory cell cell_2 is in the first storage state, the cell current Icell generated by the memory cell cell_2 is lower. Consequently, the sensing voltage Vsense cannot be increased quickly. After a response time tra, the sensing voltage Vsense does not reach the triggering voltage Vtrig-A of the sensing circuit 120. Meanwhile, a data signal Data outputted from the sensing circuit 120 has a first logic level (i.e., in a low level state). The low level state of the data signal Data denotes the first storage state of the memory cell cell_2.

If the memory cell cell_2 is in the second storage state, the cell current Icell generated by the memory cell cell_2 is higher. Consequently, the sensing voltage Vsense is increased quickly. After the response time tra, the sensing voltage Vsense reaches the triggering voltage Vtrig-A of the sensing circuit 120. Meanwhile, the data signal Data outputted from the sensing circuit 120 has a second logic level (i.e., in a high level state). The high level state of the data signal Data denotes the second storage state of the memory cell cell_2.

In case that the triggering voltage of the sensing circuit 120 is Vtrig-B, the response time of the sensing circuit 120 is trb. The response time trb is shorter than the response time tra. Since the triggering voltage of the sensing circuit 120 is lower, the response time is shorter. Under this circumstance, the sensing circuit 120 generates the data signal Data more quickly.

SUMMARY OF THE INVENTION

An embodiment of the present invention provides a sensing circuit. The sensing circuit is connected with a non-volatile memory. The sensing circuit includes a sensing stage, a reference current generator, an inverter and a latch. The sensing stage includes a voltage clamp, a first P-type transistor and a first N-type transistor. An input terminal of the voltage clamp receives a first power supply voltage. An output terminal of the voltage clamp generates a second power supply voltage. A source terminal of the first P-type transistor receives the second power supply voltage. A gate terminal of the first P-type transistor receives a cell current from a selected circuit of the non-volatile memory. A drain terminal of the first N-type transistor is connected with a drain terminal of the first P-type transistor. A gate terminal of the first N-type transistor receives a first bias voltage. A source terminal of the first N-type transistor receives a ground voltage. The reference current generator includes a second N-type transistor. A drain terminal of the second N-type transistor is connected with the gate terminal of the first P-type transistor. A gate terminal of the second N-type transistor receives a reference voltage. A source terminal of the second N-type transistor receives the ground voltage. An an input terminal of the inverter is connected with the drain terminal of the first P-type transistor. The latch has an input terminal connected with an output terminal of the inverter. In a sensing period, the latch generates a data signal to indicate a storage state of the selected cell. In the sensing period, the second power supply voltage from the voltage clamp is fixed and lower than the first power supply voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
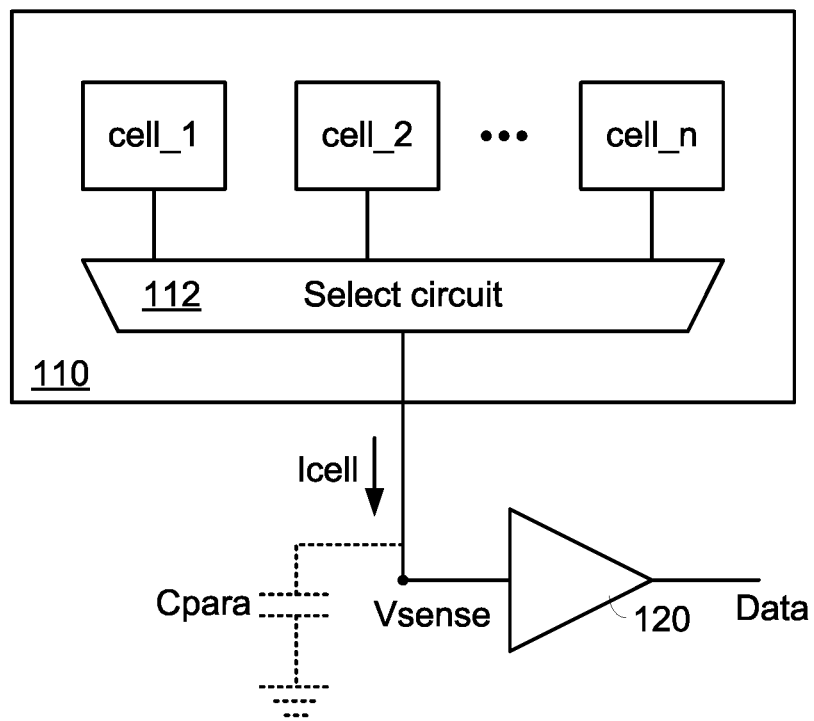
FIG. 1A (prior art) is a schematic circuit diagram illustrating a sensing circuit for a conventional non-volatile memory.
Figure 1B:
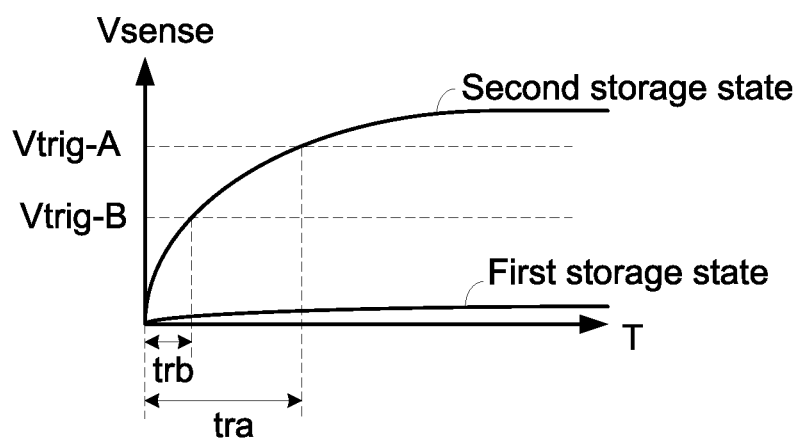
FIG. 1B (prior art) is a schematic timing diagram illustrating associated signals processed by the sensing circuit of FIG. 1A.
Figure 2A:
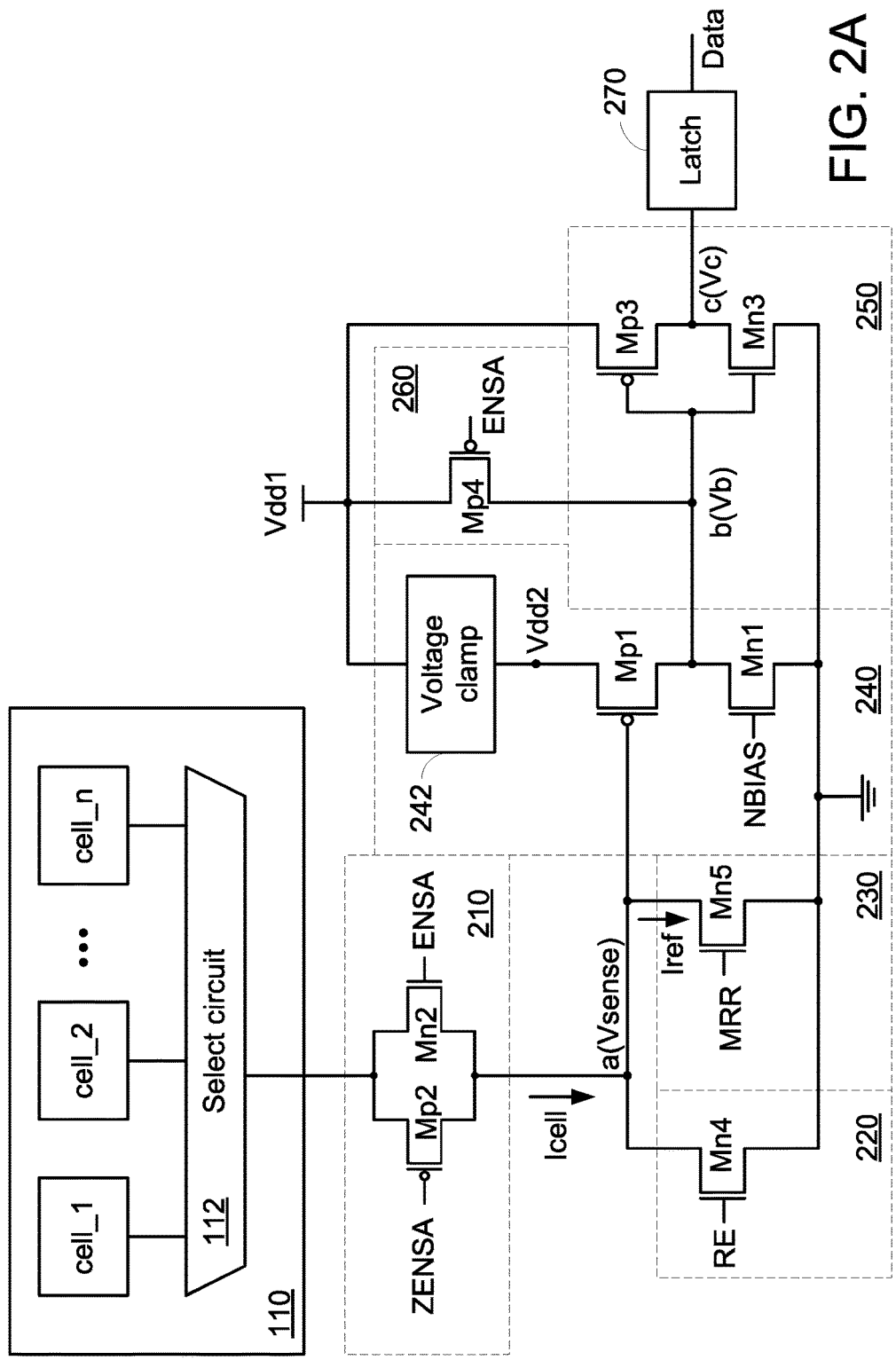
FIG. 2A is a schematic circuit diagram illustrating a sensing circuit for a non-volatile memory according to a first embodiment of the present invention.

FIG. 2A is a schematic circuit diagram illustrating a sensing circuit for a non-volatile memory according to a first embodiment of the present invention. The sensing circuit is used for judging the storage states of plural memory cells cell_1~cell_n in a non-volatile memory 110. The operations of the non-volatile memory 110 are similar to those described in FIGS. 1A and 1B, and are not redundantly described herein.

In this embodiment, the sensing circuit comprises a transmission circuit 210, a first pre-charge circuit 220, a second pre-charge circuit 260, a reference current generator 230, a sensing stage 240, an inverter 250 and a latch 270.

In an embodiment, the transmission circuit 210 is a transmission gate. The transmission circuit 210 comprises transistors Mp2 and Mn2. A first terminal of the transistor Mp2 and a first terminal of the transistor Mn2 are connected with an output terminal of the non-volatile memory 110 (I.e., the output terminal of the select circuit 112. A second terminal of the transistor Mp2 and a second terminal of the transistor Mn2 are connected with a sensing node "a". The gate terminal of the transistor Mn2 receives a sensing enable signal ENSA. The gate terminal of the transistor Mp2 receives an inverted sensing enable signal ZENSA.

The first pre-charge circuit 220 comprises a transistor Mn4. The drain terminal of the transistor Mn4 is connected with the sensing node "a". The gate terminal of the transistor Mn4 receives a pre-charge signal RE. The source terminal of the transistor Mn4 is connected with a ground terminal. The second pre-charge circuit 260 comprises a transistor Mp4. The source terminal of the transistor Mp4 is connected with a first power supply voltage Vdd1. The gate terminal of the transistor Mp4 receives the sensing enable signal ENSA. The drain terminal of the transistor Mp4 is connected with a node "b".

The reference current generator 230 comprises a transistor Mn5. The drain terminal of the transistor Mn5 is connected with the sensing node "a". The gate terminal of the transistor Mn5 receives a reference voltage MRR. The source terminal of the transistor Mn5 is connected with the ground terminal. According to the reference voltage MRR, the transistor generates a reference current Iref.

Generally, the magnitude of the reference current Iref generated by the reference current generator 230 is adjustable according to the reference voltage MRR. In case that the selected cell is in the first storage state, the selected cell generates a cell current I1. In case that the selected cell is in the second storage state, the selected cell generates a cell current I2. In this embodiment, the reference current Iref is higher than the cell current I1, and the reference current Iref is lower than the cell current I2.

The sensing stage 240 comprises a voltage clamp 242 and two transistors Mp1 and Mn1. The input terminal of the voltage clamp 242 is connected with the first power supply voltage Vdd1. The output terminal of the voltage clamp 242 generates a second power supply voltage Vdd2. The source terminal of the transistor Mp1 receives the second power supply voltage Vdd2. The gate terminal of the transistor Mp1 is connected with the sensing node "a". The drain terminal of the transistor Mp1 is connected with the node "b". The drain terminal of the transistor Mn1 is connected with the node "b". The gate terminal of the transistor Mn1 receives a bias voltage NBIAS. The source terminal of the transistor Mn1 is connected with the ground terminal.

The input terminal of the inverter 250 is connected with the node "b". The output terminal of the inverter 250 is connected with a node "c". The inverter 250 comprises transistors Mp3 and Mn3. The source terminal of the transistor Mp3 receives the first power supply voltage Vdd1. The gate terminal of the transistor Mp3 is connected with the node "b". The drain terminal of the transistor Mp3 is connected with the node "c". The drain terminal of the transistor Mn3 is connected with the node "c". The gate of the transistor Mn3 is connected with the node "b". The source terminal of the transistor Mn3 is connected with the ground terminal.

The input terminal of the latch 270 is connected with the node "c". The output terminal of the latch 270 generates a data signal Data.

Figure 2B:
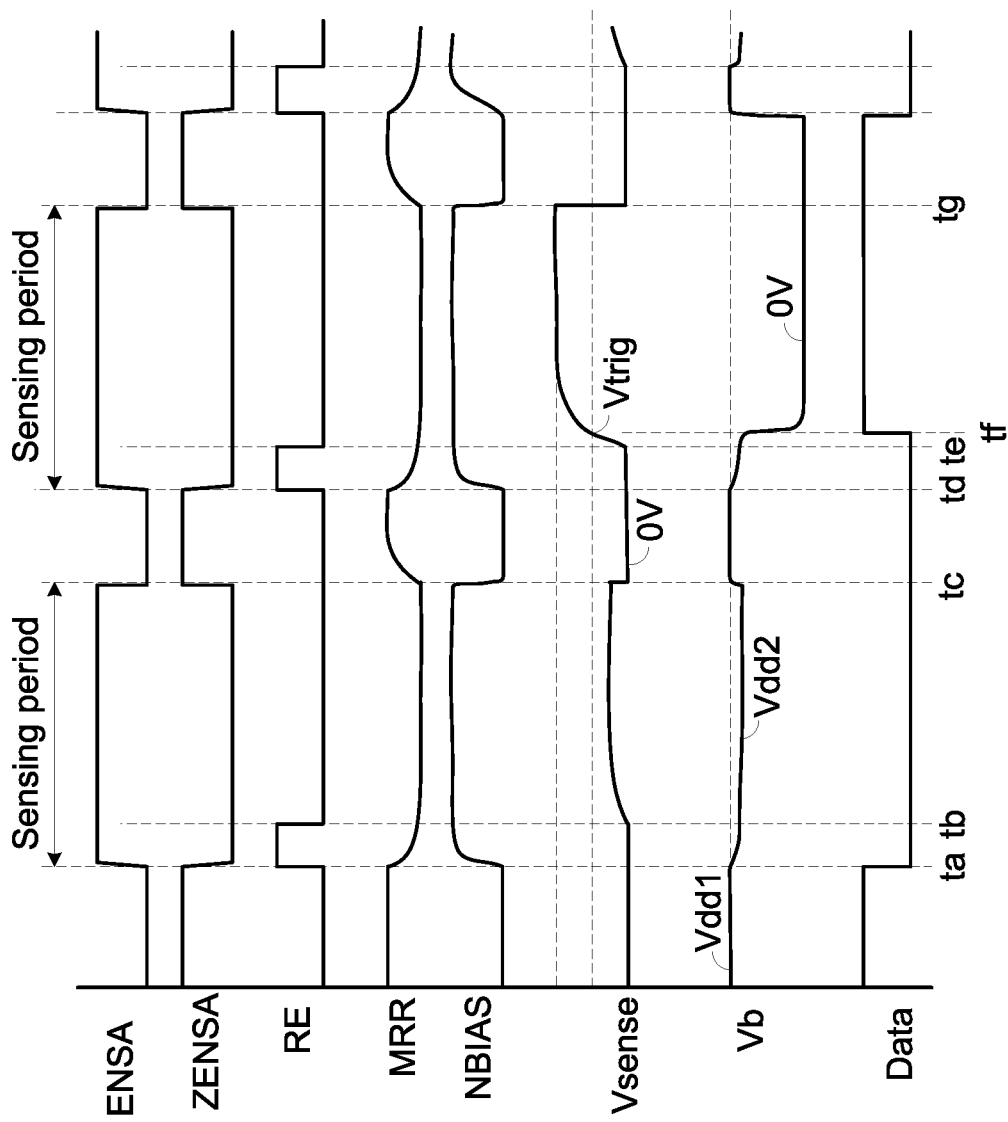
FIG. 2B is a schematic timing waveform diagram illustrating associated signals processed by the sensing circuit according to the first embodiment of the present invention.

FIG. 2B is a schematic timing waveform diagram illustrating associated signals processed by the sensing circuit according to the first embodiment of the present invention. The read cycle comprises plural sensing periods. The sensing periods are determined according to the sensing enable signal ENSA and the inverted sensing enable signal ZENSA.

In each sensing period, the sensing enable signal ENSA is in a high level state, and the inverted sensing enable signal ZENSA is in a low level state. That is, in the sensing period, the transmission circuit 210 is turned on. Consequently, the cell current Icell generated by the selected cell flows to the sensing node "a". In the sensing period, the sensing circuit judges the storage state of the selected cell. In the non-sensing period, the sensing enable signal ENSA is in the low level state. Consequently, the voltage Vb at the node "b" is pre-charged to the first power supply voltage Vdd1 by the transistor Mp4 of the second pre-charge circuit 260.

In the first sensing period between the time point ta and the time point tc, the storage state of one selected cell is judged. At the time point ta, the pre-charge signal RE is activated. Consequently, the sensing voltage Vsense at the sensing node "a" is pre-charged to a ground voltage (0V) by the first pre-charge circuit 220.

At the time point tb, the pre-charge signal RE is inactivated. The cell current Icell generated by the selected cell starts to charge the sensing node "a". Since the cell current Icell is lower, the rising speed of the sensing voltage Vsense is very slow and the sensing voltage Vsense doesn't reach a triggering voltage Vtrig of the sensing stage 240. Under this circumstance, the transistor Mp1 is continuously turned on. Consequently, after the time point tb, the voltage Vb at the node "b" is maintained at a level close to the second power supply voltage Vdd2. The output voltage Vc from the inverter 250 is the ground voltage. The data signal Data outputted from the latch 270 is in the low level state. In case that the data signal Data is in the low level state, the sensing circuit judges that the selected cell is in the first storage state.

In the second sensing period between the time point td and the time point tg, the storage state of another selected cell is judged. At the time point td, the pre-charge signal RE is activated. Consequently, the sensing voltage Vsense at the sensing node "a" is pre-charged to a ground voltage (0V) by the first pre-charge circuit 220.

At the time point te, the pre-charge signal RE is inactivated. The cell current Icell generated by the selected cell starts to charge the sensing node "a". Since the cell current Icell is higher, the rising speed of the sensing voltage Vsense is very fast. At the time point tf, the sensing voltage Vsense reaches the triggering voltage Vtrig of the sensing stage 240. Under this circumstance, the transistor Mp1 is continuously turned off. Consequently, after the time point tf, the voltage Vb at the node "b" is decreased to 0V. The output voltage Vc from the inverter 250 is equal to the first power supply voltage Vdd1. The data signal Data outputted from the latch 270 is in the high level state. In case that the data signal Data is in the high level state, the sensing circuit judges that the selected cell is in the second storage state.

As mentioned above, the cell current Icell generated by the selected cell in the first storage state is lower, and the data signal Data outputted from the sensing circuit has a first logic level (i.e., in the low level state). Whereas, the cell current Icell generated by the selected cell in the second storage state is higher, and the data signal Data outputted from the sensing circuit has a second logic level (i.e., in the high level state).

In the sensing stage 240, the voltage clamp 242 is used for decreasing the first power supply voltage Vdd1 to the second power supply voltage Vdd2. Consequently, the triggering voltage Vtrig of the sensing stage 240 is reduced, and the response time of the sensing stage 240 is shortened. That is, during the sensing period of the sensing circuit, the transistor Mp1 receives the fixed second power supply voltage Vdd2. The second power supply voltage Vdd2 is lower than the first power supply voltage Vdd1. In such way, the judging speed of the sensing circuit is effectively increased.

An example of the voltage clamp 242 includes but is not limited to a low dropout regulator (LDO) or a voltage clamping circuit.

Figure 3B:
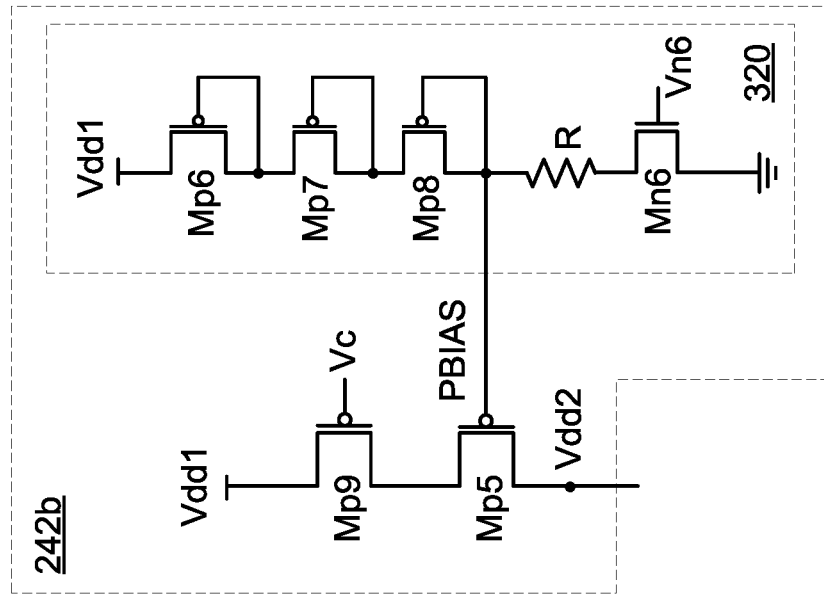
FIG. 3B is a schematic circuit diagram illustrating a second exemplary voltage clamp used in the sensing circuit according to the first embodiment of the present invention.
Figure 3A:
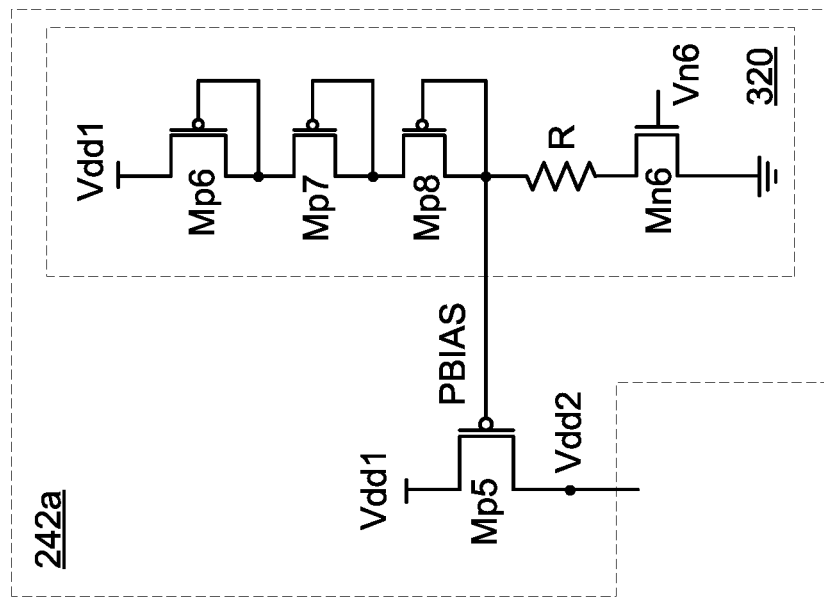
FIG. 3A is a schematic circuit diagram illustrating a first exemplary voltage clamp used in the sensing circuit according to the first embodiment of the present invention.

FIG. 3A is a schematic circuit diagram illustrating a first exemplary voltage clamp used in the sensing circuit according to the first embodiment of the present invention.

As shown in FIG. 3A, the voltage clamp 242a comprises a transistor Mp5 and a bias circuit 320. The source terminal of the transistor Mp5 is the input terminal of the voltage clamp 242a to receive the first power supply voltage Vdd1. The drain terminal of the transistor Mp5 is the output terminal of the voltage clamp 242a to generate the second power supply voltage Vdd2. The gate terminal of the transistor Mp5 receives a bias voltage PBIAS. The bias circuit 320 comprises transistors Mp6, Mp7, Mp8, Mn6 and a resistor R. The transistors Mp6, Mp7 and Mp8 are serially connected between the first power supply voltage Vdd1 and the gate terminal of the transistor Mp5 in a diode-connecting manner. The resistor R is connected between the drain terminal of the transistor Mn6 and the gate terminal of the transistor Mp5. The source terminal of the transistor Mn6 is connected with the ground terminal. The gate terminal of the transistor Mn6 receives a control voltage Vn6.

For example, the first power supply voltage Vdd1 is 6V. In the sensing period of the sensing circuit, each of the diode-connected transistors Mp6, Mp7 and Mp8 has a voltage drop of about 0.8V after the transistor Mn6 is turned on according to the control voltage Vn6. Consequently, the bias voltage PBIAS is about 3.6V (i.e., Vdd1−0.8×3=3.6). In case that the voltage drop of the transistor Mp5 is 0.8V, the second power supply voltage Vdd2 from the drain terminal of the transistor Mp5 is fixed at 4.4V after the bias voltage PBIAS (e.g., 3.6V) is provided to the transistor Mp5. It is noted that the voltage drop of the transistor Mp5 is not limited to 0.8V. In the sensing period, the first power supply voltage Vdd1 received by the voltage clamp 242a is 6V, and the second power supply voltage Vdd2 outputted from the voltage clamp 242a is 4.4V.

Moreover, the number of the diode-connected transistors in the bias circuit 320 may be varied according to the magnitude of the first power supply voltage Vdd1. Since the bias voltage PBIAS is changed, the magnitude of the second power supply voltage Vdd2 from the voltage clamp 242a is adjusted.

FIG. 3B is a schematic circuit diagram illustrating a second exemplary voltage clamp used in the sensing circuit according to the first embodiment of the present invention. In comparison with the voltage clamp 242a of FIG. 3A, the voltage clamp 242b of FIG. 3B further comprises a transistor Mp9. The operation of the transistor Mp9 will be described as follows. The operations of the other components are similar to those of FIG. 3A, and are not redundantly described herein.

The source terminal of the transistor Mp9 is the input terminal of the voltage clamp 242b to receive the first power supply voltage Vdd1. The drain terminal of the transistor Mp9 is connected with the source terminal of the transistor Mp5. The gate terminal of the transistor Mp9 is connected with the node "c", i.e., the output terminal of the inverter 250.

In case that the voltage Vc from the output terminal of the inverter 250 is equal to the first power supply voltage Vdd1, the transistor Mp9 of the voltage clamp 242b is turned off. Consequently, the judging speed of the sensing circuit is effectively increased.

In an embodiment of the sensing stage 240, the aspect ratio of the transistor Mp5 is larger than the aspect ratio of the transistor Mp1, and the aspect ratio of the transistor Mp5 is larger than the aspect ratio of the transistor Mn1.

Figure 4:
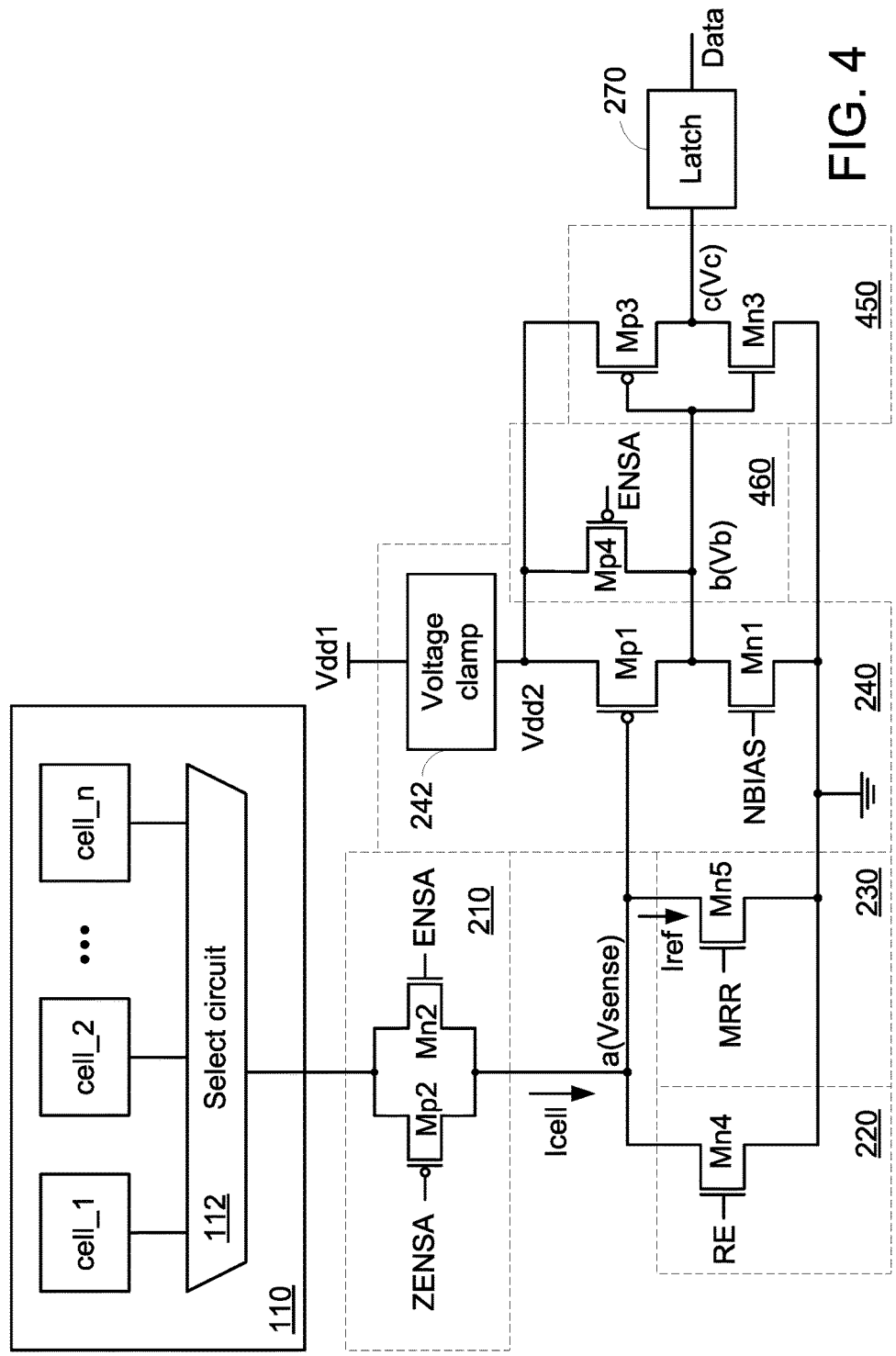
FIG. 4 is a schematic circuit diagram illustrating a sensing circuit for a non-volatile memory according to a second embodiment of the present invention.

FIG. 4 is a schematic circuit diagram illustrating a sensing circuit for a non-volatile memory according to a second embodiment of the present invention. In comparison with the first embodiment, the connecting relationship between the second pre-charge circuit 460 and the inverter 450 is distinguished. The operations of the sensing circuit of this embodiment are similar to those of the first embodiment. Hereinafter, only the second pre-charge circuit 460 and the inverter 450 will be described. The operations of the other components are not redundantly described herein.

The second pre-charge circuit 460 comprises a transistor Mp4. The source terminal of the transistor Mp4 is connected with the second power supply voltage Vdd2. The gate terminal of the transistor Mp4 receives the sensing enable signal ENSA. The drain terminal of the transistor Mp4 is connected with the node "b". The input terminal of the inverter 450 is connected with the node "b". The output terminal of the inverter 450 is connected with the node "c". The inverter 450 comprises transistors Mp3 and Mn3. The source terminal of the transistor Mp3 receives the second power supply voltage Vdd2. The gate terminal of the transistor Mp3 is connected with the node "b". The drain terminal of the transistor Mp3 is connected with the node "c". The drain terminal of the transistor Mn3 is connected with the node "c". The gate of the transistor Mn3 is connected with the node "b". The source terminal of the transistor Mn3 is connected with the ground terminal.

In the sensing period, the voltage Vb at the node "b" is pre-charged to the second power supply voltage Vdd2 by the transistor Mp4 of the second pre-charge circuit 460. Since the inverter 450 is connected with the second power supply voltage Vdd2, the output terminal of the inverter 450 generates the low-level ground voltage or the high-level second power supply voltage Vdd2.

From the above descriptions, the voltage clamp 242 of the sensing stage 240 decreases the first power supply voltage Vdd1 to the second power supply voltage Vdd2. Consequently, the triggering voltage Vtrig of the sensing stage 240 is reduced, and the response time of the sensing stage 240 is shortened. In such way, the judging speed of the sensing circuit is effectively increased.

It is noted that numerous modifications and alterations of the sensing circuit may be made while retaining the teachings of the invention. For example, in another embodiment, the transistor Mn4 of the first pre-charge circuit 220 is omitted. Moreover, the transistor Mn5 of the reference current generator 230 is properly controlled, and thus the sensing voltage Vsense is pre-charged to the ground voltage.

Moreover, the voltage Vb at the node "b" may be pre-charged to the first power supply voltage Vdd1 or the second power supply voltage Vdd2 by the second pre-charge circuit 260. In another embodiment, the second pre-charge circuit 260 is omitted. Moreover, the transistor Mn1 of the sensing stage 240 is properly controlled, and thus the voltage Vb at the node "b" is pre-charged to the ground voltage. Under this circumstance, the sensing circuit is also normally operated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sensing circuit connected with a non-volatile memory, the sensing circuit comprising:

a sensing stage comprising a voltage clamp, a first P-type transistor and a first N-type transistor, wherein an input terminal of the voltage clamp receives a first power supply voltage, an output terminal of the voltage clamp generates a second power supply voltage, a source terminal of the first P-type transistor receives the second power supply voltage, a gate terminal of the first P-type transistor receives a cell current from a selected cell of the non-volatile memory, a drain terminal of the first N-type transistor is connected with a drain terminal of the first P-type transistor, a gate terminal of the first N-type transistor receives a first bias voltage, and a source terminal of the first N-type transistor receives a ground voltage;

a reference current generator comprising a second N-type transistor, wherein a drain terminal of the second N-type transistor is connected with the gate terminal of the first P-type transistor, a gate terminal of the second N-type transistor receives a reference voltage, and a source terminal of the second N-type transistor receives the ground voltage;

an inverter, wherein an input terminal of the inverter is connected with the drain terminal of the first P-type transistor; and a latch having an input terminal connected with an output terminal of the inverter, wherein in a sensing period, the latch generates a data signal to indicate a storage state of the selected cell, wherein in the sensing period, the second power supply voltage from the voltage clamp is fixed and lower than the first power supply voltage;

wherein the voltage clamp comprises:

a second P-type transistor, wherein a source terminal of the second P-type transistor receives the first power supply voltage, a gate terminal of the second P-type transistor receives a second bias voltage, and a drain terminal of the second P-type transistor is connected with the source terminal of the first P-type transistor;

plural diode-connected transistor serially connected between the first power supply voltage and the gate terminal of the second P-type transistor;

a resistor, wherein a first terminal of the resistor is connected with the gate terminal of the second P-type transistor; and a third N-type transistor, wherein a drain terminal of the third N-type transistor is connected with a second terminal of the resistor, a gate terminal of the third N-type transistor receives a control voltage, and a source terminal of the third N-type transistor receives the ground voltage.

2. The sensing circuit as claimed in claim 1, wherein the sensing circuit further comprises a transmission circuit, and the transmission circuit comprises:

a fourth N-type transistor, wherein a drain terminal of the fourth N-type transistor is connected with an output terminal of the non-volatile memory, a gate terminal of the fourth N-type transistor receives a sensing enable signal, and a source terminal of the fourth N-type transistor is connected with the gate terminal of the first P-type transistor; and a third P-type transistor, wherein a source terminal of the third P-type transistor is connected with the output terminal of the non-volatile memory, a gate terminal of the third P-type transistor receives an inverted sensing enable signal, and a drain terminal of the third P-type transistor is connected with the gate terminal of the first P-type transistor.

3. The sensing circuit as claimed in claim 1, wherein the sensing circuit further comprises a first pre-charge circuit, and the first pre-charge circuit comprises a fifth N-type transistor, wherein a drain terminal of the fifth N-type transistor is connected with the gate terminal of the first P-type transistor, a gate terminal of the fifth N-type transistor receives a pre-charge signal, and a source terminal of the fifth N-type transistor receives the ground voltage.

4. The sensing circuit as claimed in claim 1, wherein the sensing circuit further comprises a second pre-charge circuit, and the second pre-charge circuit comprises a fourth P-type transistor, wherein a source terminal of the fourth P-type transistor receives the first power supply voltage, a gate terminal of the fourth P-type transistor receives a sensing enable signal, and a drain terminal of the fourth P-type transistor is connected with the input terminal of the inverter.

5. The sensing circuit as claimed in claim 1, wherein the sensing circuit further comprises a second pre-charge circuit, and the second pre-charge circuit comprises a fifth P-type transistor, wherein a source terminal of the fifth P-type transistor receives the second power supply voltage, a gate terminal of the fifth P-type transistor receives a sensing enable signal, and a drain terminal of the fifth P-type transistor is connected with the input terminal of the inverter.

6. The sensing circuit as claimed in claim 1, wherein the voltage clamp is a low dropout regulator or a voltage clamping circuit.

7. A sensing circuit connected with a non-volatile memory, the sensing circuit comprising:
   a sensing stage comprising a voltage clamp, a first P-type transistor and a first N-type transistor, wherein an input terminal of the voltage clamp receives a first power supply voltage, an output terminal of the voltage clamp generates a second power supply voltage, a source terminal of the first P-type transistor receives the second power supply voltage, a gate terminal of the first P-type transistor receives a cell current from a selected cell of the non-volatile memory, a drain terminal of the first N-type transistor is connected with a drain terminal of the first P-type transistor, a gate terminal of the first N-type transistor receives a first bias voltage, and a source terminal of the first N-type transistor receives a ground voltage;
   a reference current generator comprising a second N-type transistor, wherein a drain terminal of the second N-type transistor is connected with the gate terminal of the first P-type transistor, a gate terminal of the second N-type transistor receives a reference voltage, and a source terminal of the second N-type transistor receives the ground voltage;
   an inverter, wherein an input terminal of the inverter is connected with the drain terminal of the first P-type transistor; and
   a latch having an input terminal connected with an output terminal of the inverter, wherein in a sensing period, the latch generates a data signal to indicate a storage state of the selected cell,
   wherein in the sensing period, the second power supply voltage from the voltage clamp is fixed and lower than the first power supply voltage;
   wherein the voltage clamp comprises:
   a second P-type transistor, wherein a source terminal of the second P-type transistor receives the first power supply voltage, and a gate terminal of the second P-type transistor is connected with the output terminal of the inverter;
   a third P-type transistor, wherein a source terminal of the third P-type transistor is connected with a drain terminal of the second P-type transistor, a gate terminal of the third P-type transistor receives a second bias voltage, and a drain terminal of the third P-type transistor is connected with the source voltage of the first P-type transistor; and
   a bias circuit generating the second bias voltage.

8. The sensing circuit as claimed in claim 7, wherein the bias circuit comprises:
   plural diode-connected transistor serially connected between the first power supply voltage and the gate terminal of the third P-type transistor;
   a resistor, wherein a first terminal of the resistor is connected with the gate terminal of the third P-type transistor; and
   a third N-type transistor, wherein a drain terminal of the third N-type transistor is connected with a second terminal of the resistor, a gate terminal of the third N-type transistor receives a control voltage, and a source terminal of the third N-type transistor receives the ground voltage.

* * * * *